INVENTOR.
L. K. COOPER

July 27, 1965          L. K. COOPER          3,196,517
APPARATUS FOR FORMING LENGTHS OF SHAPED WIRE FROM WIRE STOCK
Filed July 11, 1963          3 Sheets-Sheet 2

3,196,517
APPARATUS FOR FORMING LENGTHS OF SHAPED WIRE FROM WIRE STOCK
Lavon K. Cooper, Pataskala, Ohio, assignor to Western Electric Company, Incorporated, New York, N.Y., a corporation of New York
Filed July 11, 1963, Ser. No. 294,338
4 Claims. (Cl. 29—33)

This invention relates to an apparatus for forming finite lengths of shaped wire from wire stock and particularly to an apparatus for forming and inserting terminals into a coil form.

In the manufacture of ferrod units for electronic switching systems, difficulty is encountered in forming and inserting terminals into the coil form of the ferrod unit. In some instances such operations involve, for example, the insertion of a 22-gauge wire into a plastic block having a width of only one-sixteenth of an inch. Further difficulties are experienced as the terminals must be located in the coil form with a high degree of accuracy so as to mate with component units when assembled.

Therefore, an object of the present invention is to provide apparatus for forming terminals.

A further object of the invention is to provide apparatus for forming terminals and inserting the terminals into a workpiece.

It is a further object of the invention to provide an apparatus for inserting terminals into a workpiece at predetermined locations.

With these and other objects in view, the present invention contemplates advancing a wire stock into a wire-forming tool until a predetermined length of wire extends beyond the tool; simultaneously gripping the extended portion of wire; shearing the gripped potrion of wire from the wire stock and flattening a portion of the wire stock; and inserting the gripped portion of wire into a workpiece.

Additionally, with the foregoing objects in view, the present invention contemplates apparatus for forming and gripping a terminal, positioning a workpiece beneath the gripped terminal, and inserting the terminal into the workpiece.

Other objects and advantages of the present invention will be apparent from the following detailed description when considered in conjunction with the accompanying drawings, wherein.

Figure 1:
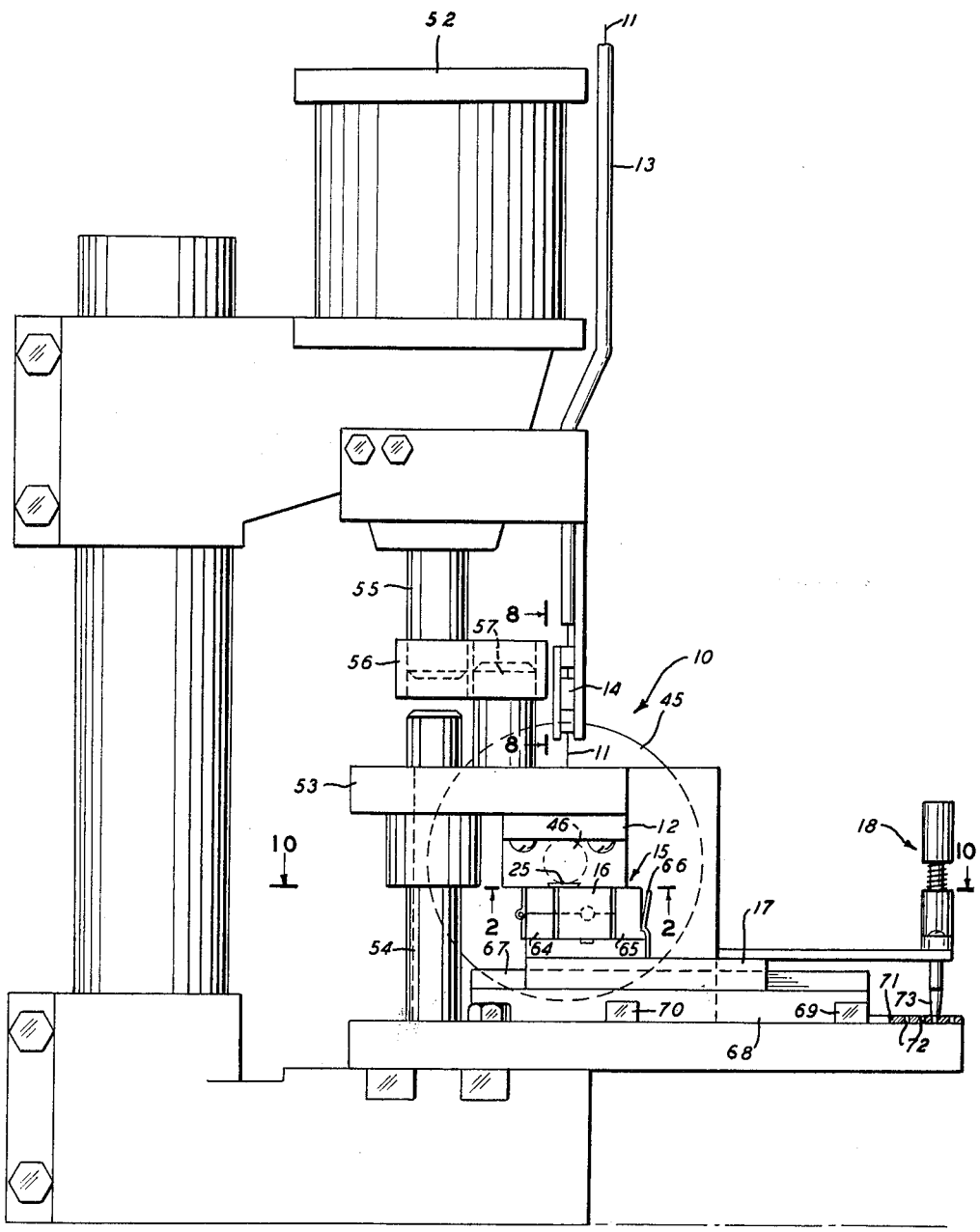
FIG. 1 is a side view of a terminal forming and insertion machine embodying the principal features of the present invention.

Referring in particular to FIG. 1, a terminal forming and insertion machine is generally indicated by the numeral 10. Terminal stock material or wire 11 is fed into die or wire-forming tool 12 through a wire guide 13. A wire stop 14 is provided to prohibit the wire 11 from moving upwardly.

Clamp 15 retains a workpiece or coil form 16 on a slide 17. The slide 17 is mounted on the terminal forming and insertion machine 10 so that upon movement of handle 18, the coil form 16 is properly positioned beneath the forming tool 12 for insertion of a terminal 19.

Figures 2, 8:
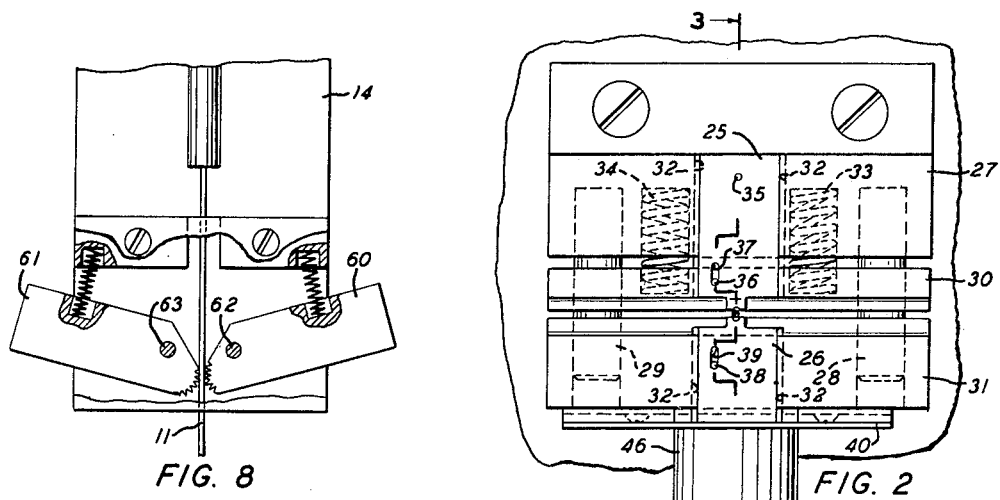
FIG. 2 is a sectional view of FIG. 1 taken along lines 2—2.
FIG. 8 is a sectional view of FIG. 1 taken along lines 8—8.
Figure 3:
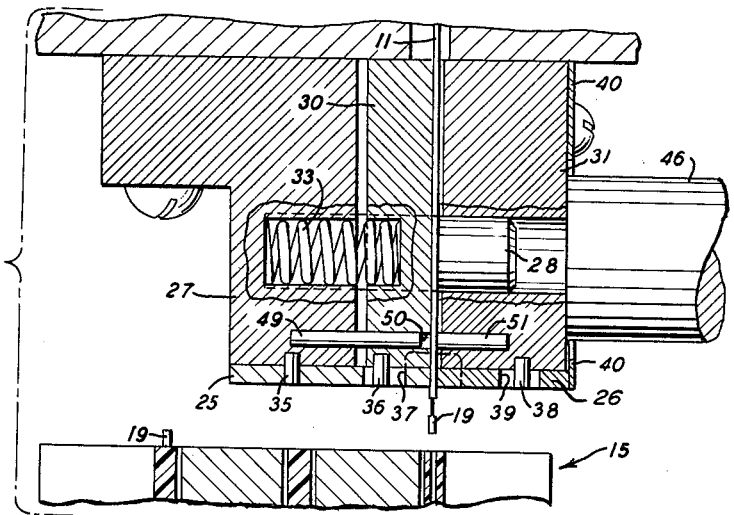
FIG. 3 is a sectional view of FIG. 2 taken along lines 3—3.
Figure 4:
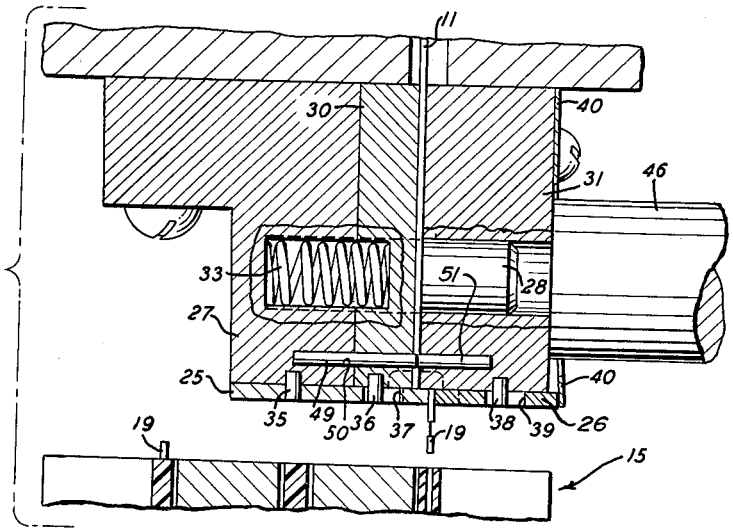
FIG. 4 is the same view as FIG. 3 showing the formation of a terminal.

Referring now to FIGS. 2, 3 and 4, the details of the forming tool are set forth.

As best seen in FIG. 2, the wire 11 is clamped or held between fingers 25 and 26. Guide 27 is provided with two shafts 28 and 29, which shafts are fixedly mounted to member 27 with their axis parallel. The die or wire-forming tool 12 has two opposed members 30 and 31. The members 30 and 31 are slidably carried by the shafts 28 and 29 of guide 27. Each of the members 30 and 31 and the guide 27 are provided with an aligned dovetail slot 32. The finger 25 is carried in the dovetail slot of guide 27 and member 30, and finger 26 is carried in the dovetail slot of member 31.

Guide 27 and member 30 are spring biased apart by springs 33 and 34. The finger 25 is fixedly mounted in the dovetail slot of guide 27 by pin 35. Member 30 is provided with a fixed pin 36 which mates with a slot 37 in finger 25 so as to permit member 30 to be displaced relative to finger 25.

Finger 26 is carried in the dovetail slot of member 31. Pin 38 is fixedly mounted in the dovetail slot of member 31 and mates with slot 39 so as to permit member 31 to move relative to finger 26. A leaf spring 40 is fixedly mounted at one end to member 31 and the free end of the leaf spring 40 engages finger 26 so as to urge finger 26 against finger 25 thereby holding or gripping the wire 11 between the fingers 25 and 26.

The members 30 and 31 of the die or wire-forming tool 12 have two positions, an open position (FIG. 3) and a closed position (FIG. 4).

Air cylinder 45 is provided for positioning members 30 and 31. Piston arm 46 of air cylinder 45 is fixedly mounted to member 31.

In FIG. 3 the air cylinder 45 is actuated so as to displace member 31 to its open position. This permits the springs 33 and 34 to urge member 30 away from the guide 27.

In FIG. 4 the air cylinder 45 is actuated so as to displace member 31 to its closed position. In its closed position member 31 is displaced to the left, as seen in FIG. 4, and abuts against member 30 so as to displace member 30 against guide 27.

Figures 5, 6:
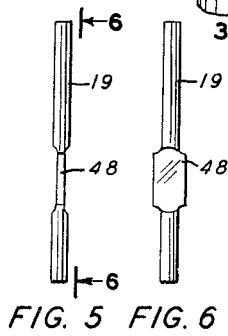
FIGS. 5 and 6 are views of a terminal.

In FIGS. 5 and 6 the finished terminal 19 is shown. The terminal 19 is provided with a flattened or coined portion 48 for retaining the terminal in the coil form 16.

The guide 27 has fixedly mounted therein a pin 49. The pin 49 mates with a bore 50 in member 30, as will be more clearly seen in FIG. 3. Upon actuation of the air cylinder 45, member 30 is displaced to the left by member 31 until member 30 abuts against guide 27. In this position, as seen in FIG. 4, the pin 49 will extend from member 30 a distance less than one half the wire diameter.

Oppositely opposed to pin 49 is a pin 51 carried by member 31. Pin 51 extends beyond member 31 a distance less than one half the wire diameter. Thus, as seen in FIG. 4, when members 30 and 31 have been displaced to the left by piston arm 46 so as to close the die or wire-forming tool 12, the wire 11 will be flattened or coined by pins 49 and 51 so as to form the flattened portion 48 of the terminal 19. The die or wire-forming tool in its closed position retains the wire 11 so as to pull the wire with the tool in the terminal-insertion operation.

As the member 31 is displaced to the left, the terminal 19 will be sheared from the wire 11 by the relative movement of the adjacent surfaces of member 31 and finger 25. In this position, the leaf spring 40 carried by member 31 exerts an increased force on the finger 26 so as to grip or hold the newly formed terminal 19 firmly between the fingers 25 and 26.

Figure 7:
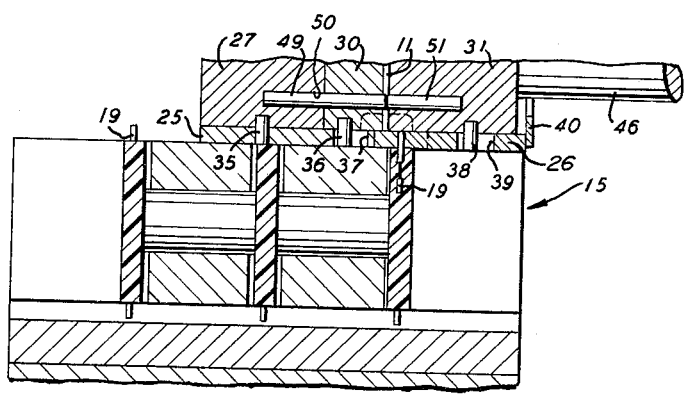
FIG. 7 is the same view as FIGS. 3 and 4 showing the insertion of a terminal into a coil form.

It is at this point that the air cylinder 52 is actuated to lower the wire-forming tool 12 and insert the terminal 19 into the coil form 16, as will be more clearly seen in FIG. 7.

Returning to FIG. 1, wire-forming tool 12 is fixedly mounted to support arm 53. The support arm 53 is keyed to guide 54 for free vertical displacement in response to air cylinder 52. Piston arm 55 of air cylinder 52 carries a bracket 56. The support arm 53 is retained in bracket 56 by shaft 57. Thus, upon actuation of the air cylinder 52, the wire-forming tool 12 is raised and lowered.

The wire-forming tool 12 is lowered in its closed position (FIG. 4). As the wire-forming tool 12 is lowered by air cylinder 52, the wire 11 is pulled down with the tool. The member 31 backs the terminal 19 so that the terminal is inserted into the coil form 16. After insertion of the terminal 19 into the coil form 16, the air cylinder 45 is actuated to open the wire-forming tool 12 so as to release the wire 11 and terminal 19. Thus, as the air cylinder 52 is actuated to raise the wire-forming tool 12, wire 11 is inserted into the tool 12 until at the end of the upward travel of the wire-forming tool the desired length of wire is advanced into the wire-forming tool for the next terminal-forming operation.

As seen in FIG. 8, a wire stop 14 is provided to insure that wire 11 will not be carried back up with the tool 12 when the tool is raised.

Fingers 60 and 61 are pivoted about pins 62 and 63. As wire 11 is pulled down by the lowering of the wire-forming tool 12, the fingers 60 and 61 are pivoted so as to permit the wire to follow tool 12. As the wire-forming tool 12 is raised, the fingers 60 and 61 are pivoted so as to clamp the wire 11 between the serrated edges of fingers 60 and 61 thereby prohibiting any upward movement of the wire 11. This will, in effect, insert a new length of wire into the wire-forming tool 12 for the next operation.

Figure 9:
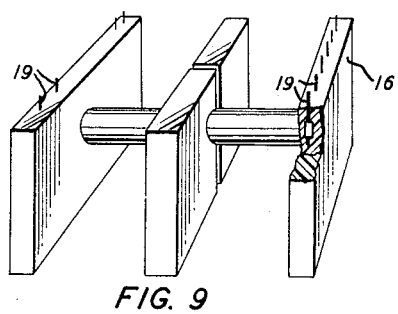
FIG. 9 is a partially cutaway view of a coil form.

In FIG. 9, a coil form 16 with the terminals 19 inserted therein is shown. The coil form 16 is held by the clamp 15 (FIG. 1). Holes are formed in the coil form 16 for accommodating the terminals 19 prior to the coil form's being placed in the clamp 15. For example, the coil form may be molded with the holes therein. The holes are of slightly smaller diameter than the terminals. Thus, the flattened portion 48 of the terminal serves to further secure the terminal in the coil form.

The coil clamp 15 has a lower cradle 64 which accommodates the coil form 16. A cover 65 is hinged to the cradle 64 and is released by the latch 66. To place a coil form 16 in the coil clamp 15, the cover 65 of the coil clamp is released by latch 66 and is swung back out of the way. A coil form is then placed in the cradle 64 and the cover closed so as to retain the coil form 16 in the clamp 15.

Figure 10:
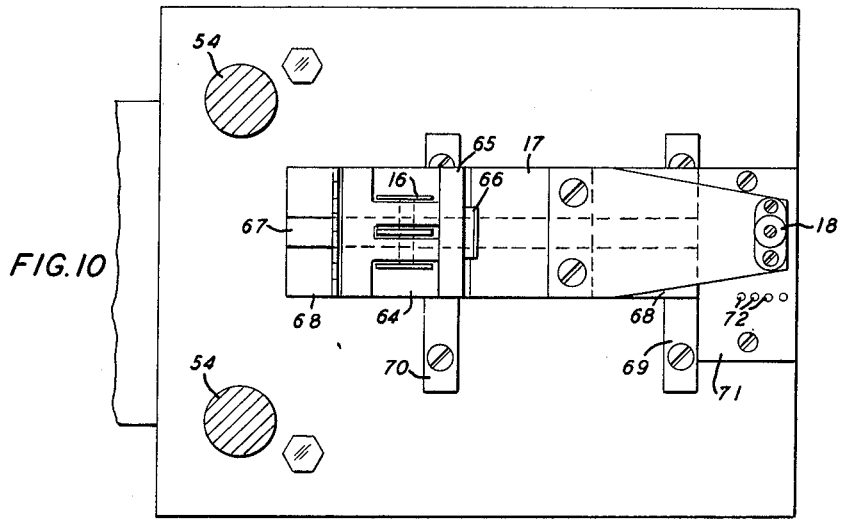
FIG. 10 is a sectional view of FIG. 1 taken along lines 10—10.

Clamp 15 is mounted on the slide 17. Slide 17 is provided with a dovetail slot which slot mates with the dovetail 67 of member 68. This permits the slide 17 free displacement along its longitudinal axis, as seen in FIG. 10.

Member 68 is mounted on the guides 69 and 70 that the member 68 may be freely displaced at right angles to the slide 17.

A master 71 is provided with holes 72 which are placed in the master 71 so as to coincide with the positions on the coil form 16 at which the terminals 19 are to be inserted. Thus, by displacing the clamp 15 until finger 73 of handle 18 is inserted into one of the holes 72 of master 71, the coil form 16 is properly positioned beneath the wire-forming tool 12 for the insertion of a terminal 19. By repeating this process each of the terminals will be properly inserted in the coil form 16.

IN OPERATION

A coil form 16 is first placed in the clamp 15 and the finger 73 is inserted in the first hole 72 of the master 71.

Air cylinder 45 is then actuated so as to displace members 30 and 31 to the left, as viewed in FIG. 4, thereby shearing or cutting a terminal 19 from the terminal wire 11 and forming the flattened portion 48 of the next terminal.

Then, air cylinder 52 is actuated to lower the wire-forming tool 12 so as to insert the terminal 19 into the coil form 16. After which, air cylinder 45 is actuated to open the wire-forming tool 12 so as to release the wire 11 and the terminal 19. Air cylinder 52 is then actuated to raise the wire-forming tool 12.

As the wire-forming tool 12 is raised, wire stop 14 prohibits the terminal wire 11 from moving upwardly with tool 12 so as to insert a new length of terminal wire into the tool.

Handle 18 is then positioned so as to insert finger 73 into the next hole 72 of master 71 and the procedure described above is repeated.

In starting up the machine with a new wire supply, the first terminal sheared will not have a flattened portion 48. Thus, the apparatus will be actuated once so as to discharge this terminal and extend a flattened portion of wire from the wire-forming tool 12 before a coil form 16 is placed in the clamp 15. Thereafter, each terminal sheared from the wire stock 11 will have a flattened or coined portion 48.

The above-described methods and arrangements of apparatus and elemental parts are simply illustrative of an application of the principles of the invention and many other modifications may be made without departing from the invention.

For example, hydraulic cylinders, solenoids or any other equivalent may be used in the place of the air cylinders 45 and 52. The coil form 16 may be raised to insert the terminal 19 instead of lowering the wire-forming tool 16. Also, a positive feed can be used to advance the wire into the wire-forming tool 12.

What is claimed is:

1. Apparatus for forming finite lengths of shaped wire from wire stock, the apparatus comprising:

first and second opposed spaced-apart terminal gripping fingers operable to grip a finite length of formed wire therebetween, a stationary member fixedly mounting the first finger such that said first finger extends in one direction therefrom, first and second wire stock receiving members supported by said stationary member for movement adjacent said fingers in said one direction and in a second direction opposite said one direction, said first and second members including respective first and second spaced-apart opposed faces for receiving wire stock therebetween, the first member being driven by movement of the second member in said second direction so that said first finger projects beyond said first face of said first member, means mounting the second gripping finger for biased, slidable movement on said second member, movement of a surface of the second member in said second direction shearing a length of wire stock gripped between said second finger moving with said second member in said second direction and said first finger projecting from said first member, and providing an abutting surface for a previously formed length of wire gripped between said fingers, a pair of substantially opposed wire stock shaping elements, one element of said pair being mounted on said stationary member and extending into a bore formed in said first member, said one element projecting from said first face of said first member to contact the wire stock upon movement of said first member in said second direction, the other element of said pair projecting from said second face of said second member a predetermined distance and coacting with said one element upon movement of said first and second members in said second direction to shape a length of wire stock positioned therebetween, means for driving said second member against said first member until both members are driven initially in said second direction so as to shear a previously shaped length of wire stock against a surface of said second member thereby providing a formed wire, and to shape a successive length of wire stock positioned between said members, the driving means thereafter driving said second member in said one direction, and means for advancing the successive length of shaped wire stock between said first and second fingers upon movement of said second member in said one direction.

2. Apparatus for forming finite lengths of shaped wire from wire stock and for inserting the formed wire into a workpiece, the apparatus comprising:

first and second opposed spaced-apart terminal gripping fingers operable to grip a finite length of formed wire therebetween, a stationary member fixedly mounting the first finger such that said first finger extends in one direction therefrom, first and second wire stock receiving members supported by said stationary member for movement adjacent said fingers in said one direction and in a second direction opposite said one direction, said first and second members including respective first and second spaced-apart opposed faces for receiving wire stock therebetween, the first member being driven by movement of the second member in said second direction so that said first finger projects beyond said first face of said first member, means mounting the second gripping finger for biased, slidable movement on said second member, movement of a surface of the second member in said second direction shearing a length of wire stock gripped between said second finger moving with said second member in said second direction and said first finger projecting from said first member, and providing an abutting surface for a previously formed length of wire gripped between said fingers, a pair of substantially opposed wire stock shaping elements, one element of said pair being mounted on said stationary member and extending into a bore formed in said first member, said one element projecting from said first face of said first member to contact the wire stock upon movement of said first member in said second direction, the other element of said pair projecting from said second face of said second member a predetermined distance and coacting with said one element upon movement of said first and second members in said second direction to shape a length of wire stock positioned therebetween, means for driving said second member against said first member until both members are driven initially in said second direction so as to shear a previously shaped length of wire stock against a surface of said second member thereby providing a formed wire, and to shape a successive length of wire stock positioned between said members, the driving means thereafter driving said second member in said one direction, means for driving said fingers towards a workpiece so that the formed wire gripped by said fingers is inserted into the workpiece, and means for advancing the successive length of shaped wire stock between said first and second fingers upon movement of said second member in said one direction after formed wire insertion by said means for driving said second member.

3. Apparatus for forming finite lengths of shaped wire from wire stock and for inserting the formed wire into a workpiece, the apparatus comprising:

first and second opposed spaced-apart terminal gripping fingers operable to grip a finite length of formed wire therebetween, a stationary member fixedly mounting the first finger such that said first finger extends in one direction therefrom, first and second wire stock receiving members supported by said stationary member for movement adjacent said fingers in said one direction and in a second direction opposite said one direction, said first and second members including respective first and second spaced-apart opposed faces for receiving wire stock therebetween, the first member being driven by movement of the second member in said second direction so that said first finger projects beyond said first face of said first member, means mounting the second gripping finger for biased, slidable movement on said second member, movement of a surface of the second member in said second direction shearing a length of wire stock gripped between said second finger moving with said second member in said second direction and said first finger projecting from said first member, and providing an abutting surface for a previously formed length of wire gripped between said fingers, a pair of substantially opposed wire stock shaping elements, one element of said pair being mounted on said stationary member and extending into a bore formed in said first member, said one element projecting from said first face of said first member to contact the wire stock upon movement of said first member in said second direction, the other element of said pair projecting from said second face of said second member a predetermined distance and coacting with said one element upon movement of said first and second members in said second direction to shape a length of wire stock positioned therebetween, means for driving said second member against said first member until both members are driven initially in said second direction so as to shear a previously shaped length of wire stock against a surface of said second member thereby providing a formed wire, and to shape a successive length of wire stock positioned between said members, the driving means thereafter driving said second member in said one direction, means for indexing a workpiece in position relative to said gripping fingers to receive a formed wire therefrom, means for driving said fingers towards a workpiece so that the formed wire gripped by said finger is inserted into the workpiece, and means for advancing the successive length of shaped wire stock between said first and second fingers upon movement of said second member in said one direction after formed wire insertion by said means for driving said second member.

4. Apparatus for forming finite lengths of shaped wire from wire stock, the apparatus comprising:

first and second opposed spaced-apart terminal gripping fingers operable to grip a finite length of shaped wire therebetween, a stationary member fixedly mounting the first finger such that said first finger extends in one direction therefrom, first and second wire stock receiving members supported by said stationary member for movement adjacent said fingers in said one direction and in a second direction opposite said one direction,
- said first and second members including respective first and second spaced-apart opposed faces for receiving wire stock therebetween,
- the first member being driven by movement of the second member in said second direction so that said first finger projects beyond said first face of said first member, means mounting the second gripping finger for biased, slidable movement on said second member, movement of a surface of the second member in said second direction shearing a length of wire stock gripped between said second finger moving with said second member in said second direction and said first finger projecting from said first member, and providing an abutting surface for a previously shaped length of wire gripped between said fingers, a pair of substantially opposed wire stock shaping elements,
- one element of said pair being mounted by said stationary member and extending into a bore formed in said first member, said one element projecting from said first face of said first member in substantial alignment with the wire stock upon movement of said first member in said second direction,
- the other element of said pair projecting from said second face of said second member a predetermined distance and coacting with said one element upon movement of said first and second members in said second direction to shape a length of wire stock positioned therebetween, means for resiliently urging said first member in said one direction towards said second member, means for driving said second member against said first member until both members are driven initially in said second direction so as to shear a previously shaped length of wire stock against a surface of said second member thereby providing a formed wire and to shape a successive length of wire stock positioned between said members, the driving means thereafter driving said second member in said one direction, and means for advancing the successive length of shaped wire stock between said first and second fingers upon movement of said first and second members in said one direction.

References Cited by the Examiner

UNITED STATES PATENTS

| | | | |
|---|---|---|---|
| 1,453,456 | 5/23 | Gerrard | 29—34.4 |
| 1,803,871 | 5/31 | Sqritta | 29—33.9 |
| 1,914,514 | 6/33 | Lapham | 29—34.4 |
| 2,251,434 | 8/41 | Weiss et al. | 29—33.9 |
| 2,421,474 | 6/47 | Alter | 1—350 |
| 2,953,842 | 9/60 | Holtz et al. | 29—155.55 |
| 2,955,352 | 10/60 | Wintriss | 29—155.55 |
| 2,979,721 | 4/61 | Helda | 1—358 |

RICHARD H. EANES, Jr., *Primary Examiner.*

JOHN F. CAMPBELL, *Examiner.*